March 29, 1927.
W. S. DWYER
1,622,425
UNIVERSAL JOINT
Filed Aug. 10, 1926
2 Sheets-Sheet 1
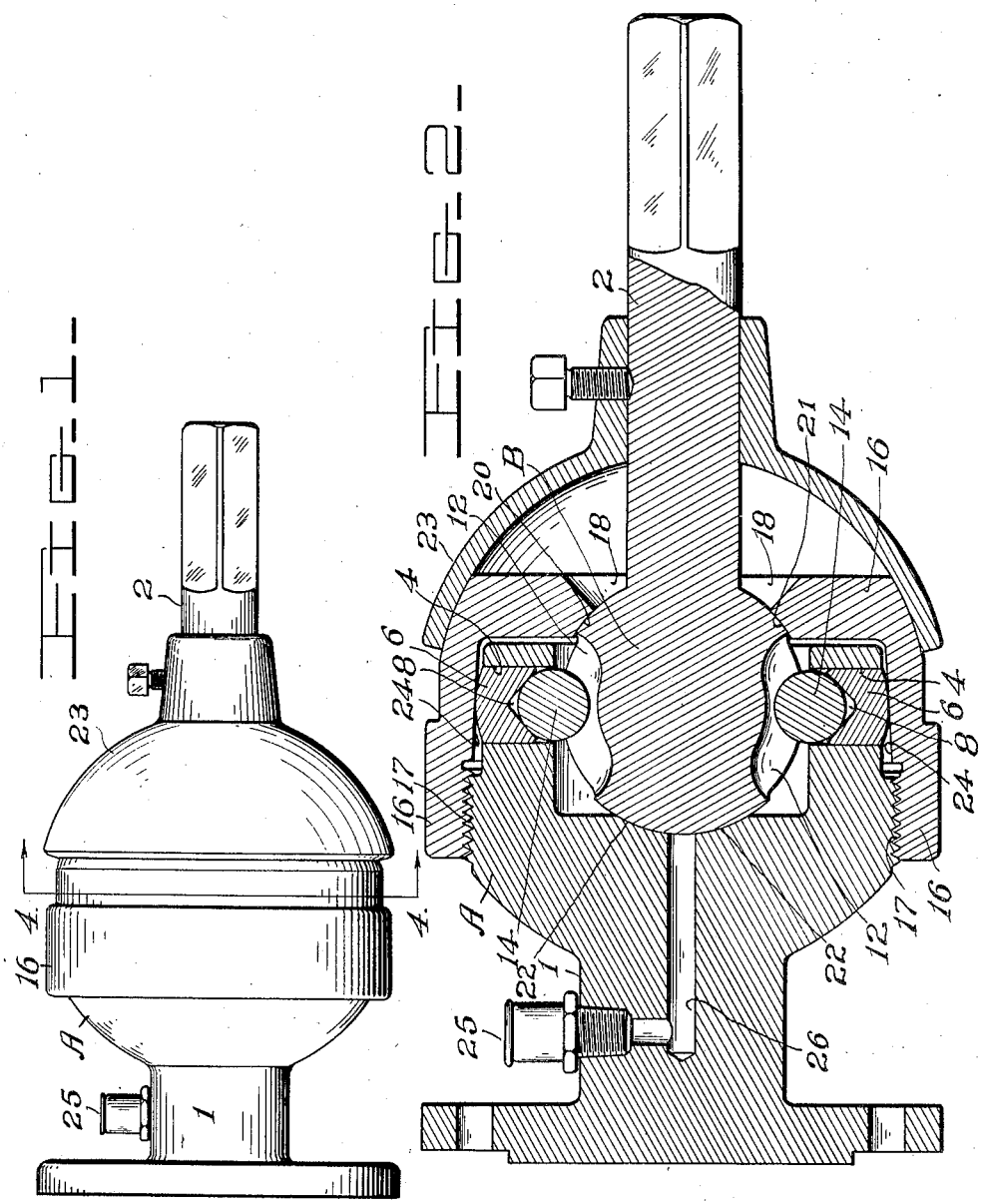
Inventor
William S. Dwyer
by
Attorney March 29, 1927.
W. S. DWYER
UNIVERSAL JOINT
Filed Aug. 10, 1926
1,622,425
2 Sheets-Sheet 2
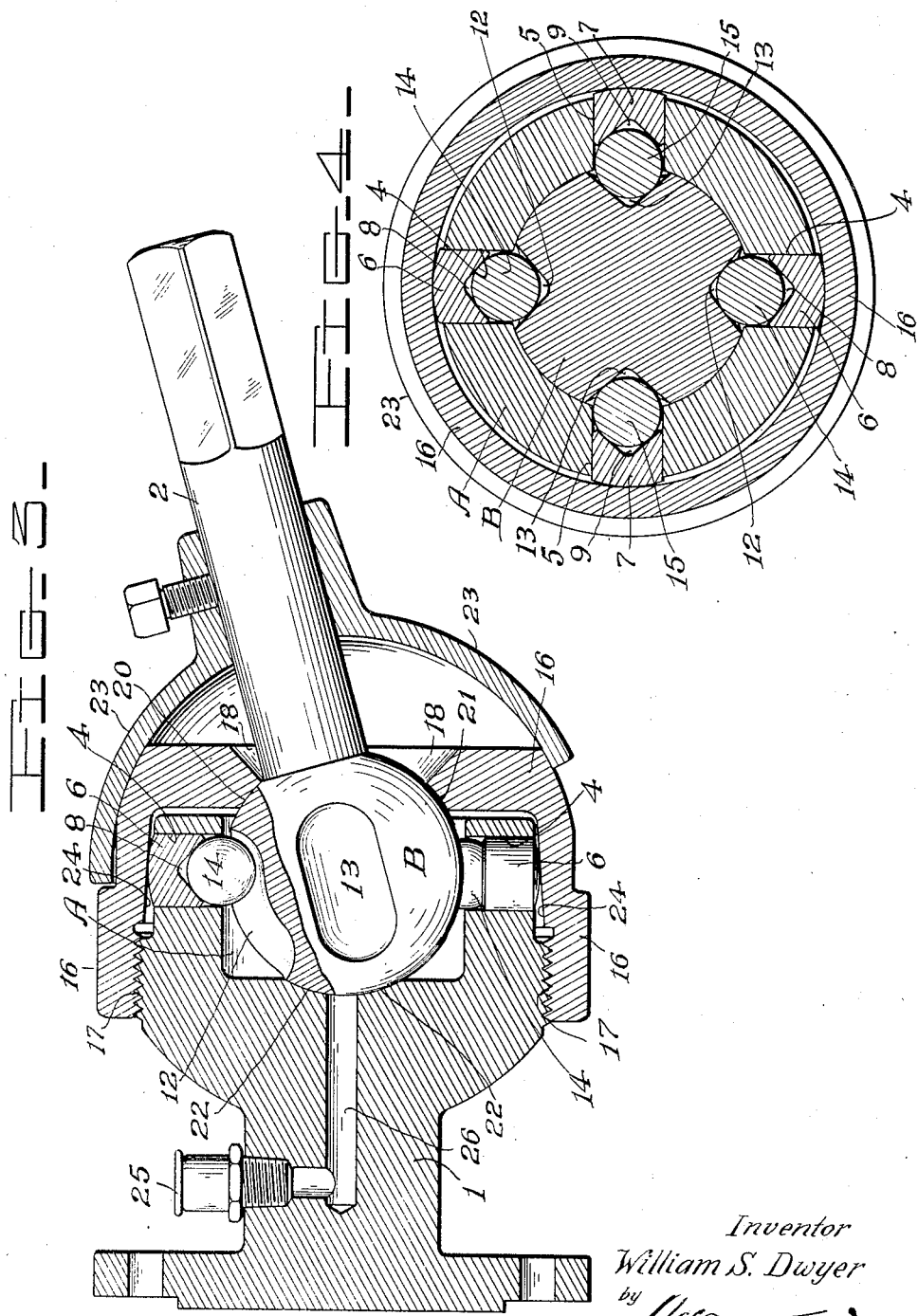
Inventor
William S. Dwyer
by
Attorney Patented Mar. 29, 1927.

1,622,425

UNITED STATES PATENT OFFICE.

WILLIAM S. DWYER, OF DEVON, CONNECTICUT.

UNIVERSAL JOINT.

Application filed August 10, 1926. Serial No. 128,364.

This invention relates to universal joints such as are commonly used to connect two rotary elements, but more particularly is identified with that class of such devices known as ball and socket joints, and has for its object stability, simplicity, and efficiency of the joint, compensation for wear, a minimum of friction between the members of the joint, and the locking together of the members of the joint as to axial rotation.

In the accompanying drawings which are to be read as a part of this application—

Figure 1 is a side elevation showing two rotary parts connected by the improved joint.

Figure 2 is a longitudinal section.

Figure 3 is a section similar to Figure 2, but showing the ball members of the joint mainly in elevation, and Figure 4 is a section at the line 4—4 of Figure 1.

Similar numerals will be used to denote like parts in the several figures of the drawing.
1, 2, denote rotary parts that are to be connected by the universal joint.

The part 1 terminates in a socket A while the part 2 terminates in a ball B which is housed within said socket as will be presently explained.

Extending through diametrically opposite sides of this socket are two pairs of pockets 4, 5, said pairs being disposed at right angles to each other, and loose within these pockets are bearing blocks 6, 7, which have in their inner faces cone shaped bearing recesses 8, 9, the outer faces of these blocks extending slightly beyond the outer wall of the socket for the purpose hereinafter to be explained.

Formed within diametrically opposite locations in the face of the ball B are two pairs of elongated V-shaped recesses 12, 13, said pairs being disposed at right angles to each other, and the relation of these recesses to the blocks 6, 7, is such that said blocks and recesses may be alined and bearing balls 14, 15, respectively, contained within the blocks 6 and recesses 12 and the blocks 7 and recesses 13, so as to afford journals for the ball B that are at right angles to each other.

16 is a keeper shell whose inner end has threaded engagement, denoted by 17, with the outer rear portion of the socket A, and whose outer face has a diverging opening 18 through which the part 1 extends. The inner wall of this shell 16 conformably fits the ball at opposed locations noted by the numerals 20 and 21, while the rear wall of the socket A also conformably fits the ball as shown at 22, so that it will be clear that these seats 20, 21, and 22 form triangularly disposed journals for the periphery of the ball, and this sort of journalling is mechanically an excellent one and reduces friction to a minimum.

Any swaying movements of the rotary members, that carry the parts A, B, are readily permitted, and rotary motion of one part will be transmitted to the other part owing to the fact that the bearing balls 14 and 15 lock together the socket A and ball B so far as any axial movements are concerned, and should the parts get out of alinement during rotation, no harm can result since the elongated recesses 12, 13, would traverse these balls 14 and 15, and therefore amply provide for this.

A dust cap 23 is secured to the part 2 and closes the face of the shell 16, the outside of the latter being spherically shaped while the inner surface of the cap conformably fits thereon so that the cap will function when there are any swaying movements of either the part 1 or the part 2.

Any wear between the ball B and the walls of the socket A and shell 16, is compensated for by driving the shell inwardly on the socket, and since there is always more or less wear between the balls 14, 15, and the bearings 8, 9, and 12, 13, which wear is greater than the wear between the ball B and the walls of the socket A and shell 16, and as the inner wall of the shell which contacts the outer ends of the bearing blocks 6, 7, is inclined, as shown at 24, while said ends are rounded, it will be clear that the inward driving of the shell will likewise compensate for the wear between said balls and their bearings.

A suitable oil cup 25 is located in the part 1, and an oil duct 26 leads therefrom to the socket so as to lubricate all the movable members of the joint.

While it is preferred to provide the elongated recesses 12, 13, in the ball B, and the cone-shaped recesses 8, 9, in the bearing blocks 6, 7, it will be obvious that this arrangement may be reversed and the cone-shaped recesses formed in the ball, the bearing blocks with the elongated recesses being located in suitably shaped openings in the socket wall, and the invention is not limited in this respect.

Also, both the ball B and the blocks 6, 7, may have elongated bearing recesses, so long as the latter are disposed at an angle to the plane of the axial rotation of the parts 1, 2, that is to say, at an angle to a plane that is at right angles to the axis of rotation. But the simplest and the preferred construction is shown in the drawings where the bearing recesses in one member restrict the balls as against any play, while the bearing recesses in the other member are elongated so as to either traverse the balls or to permit the balls to have free play.

Also, it will be evident that any desired number of bearing recesses for the balls may be employed in the periphery of the ball B and in the wall of the socket A, it being merely necessary that the members should always be locked together as to axial rotation, and that the balls should be allowed free play in order to permit swaying movements of the parts 1, 2, outside the axis of rotation.

The bearing recesses are all formed so as to afford a limited contact with the balls to prevent unnecessary friction, but the character of these bearings is subject to variation as is the case in all ball bearing structures.

What is claimed is:—

1. An universal joint, comprising ball and socket members having alined pairs of diametrically opposed bearing recesses, said pairs being disposed at an angle to each other, the recesses in one member being elongated, while the recesses carried by the socket member are formed in blocks which extend loosely within pockets in the socket and have their outer faces extending beyond the outer wall of the socket, ball bearings housed within said recesses, a keeper shell, said socket and shell having complementary bearings for said ball, and said shell being adjustably connected to said socket whereby the wear between said ball and socket may be compensated for, and means carried by said shell and cooperating with said blocks whereby adjustment of said shell as above noted will automatically cause the wear between said balls and recesses to be compensated for.

2. An universal joint, comprising ball and socket members having alined pairs of diametrically opposed bearing recesses, said pairs being disposed at an angle to each other, the recesses in one member being elongated, while the recesses carried by the socket member are formed in blocks which extend loosely within pockets in the socket and have their outer faces extending beyond the outer wall of the socket, ball bearings housed within said recesses, and a keeper shell having a threaded engagement with the exterior face of the socket and formed with a tapered inner wall against which said outer faces abut, whereby, when said shell is driven inward on the socket to take up wear between said ball and socket, said blocks will be automatically adjusted to compensate for the wear between said balls and recesses.

3. An universal joint comprising a rotary part terminating in a socket member, a rotary part terminating in a ball member which is housed within the socket member, a keeper shell whose interior face has a threaded engagement with the outer face of said socket member and which has a flaring axial opening through which said part carrying the ball member extends, the inner wall of said shell being tapered, said ball member having in its surface two pairs of diametrically opposed elongated V-shaped recesses, each pair at right angles to the other, the wall of the socket member having extending therethrough two pairs of diametrically opposed pockets, said pairs being at right angles to each other, bearing blocks having cone shaped recesses and extending loosely through said pockets against said tapered wall of the shell, and balls housed within the alined recesses in said ball member and blocks.

4. An universal joint comprising a rotary part terminating in a socket member and a rotary part terminating in a ball member, the latter housed within the former, a keeper shell threaded to said socket member and having its inner wall inclined, said shell and socket member carrying curved surfaces which function as journals for the periphery of the ball member, said members being each provided with a plurality of bearings, the bearings of one member being alined with and opposed to the bearings of the other member while the bearings in the socket are formed within blocks that loosely extend through the socket walls with their outer ends in abutment with the inclined inner wall of the shell, and walls within said bearings, the bearings of at least one member being elongated in a line at an angle to the plane of axial rotation of said parts.

5. An universal joint comprising a rotary part terminating in a socket, a rotary part terminating in ball peripherally journaled within said socket, ball journal recesses in said ball and socket, balls in said recesses, said ball and socket locked by said balls as to axial rotation, while the balls have a play at an angle to a vertical plane taken through the axis of rotation, and a keeper shell having threaded engagement with said socket and provided with complementary bearings for said ball, said shell having its inner wall inclined, and the recesses carried by the socket being formed within blocks extending through and freely movable within openings in the socket walls and having their outer ends always in abutment with the inner inclined wall of the keeper shell.

In testimony whereof I affix my signature hereto.

WILLIAM S. DWYER.